Patented Sept. 20, 1927.

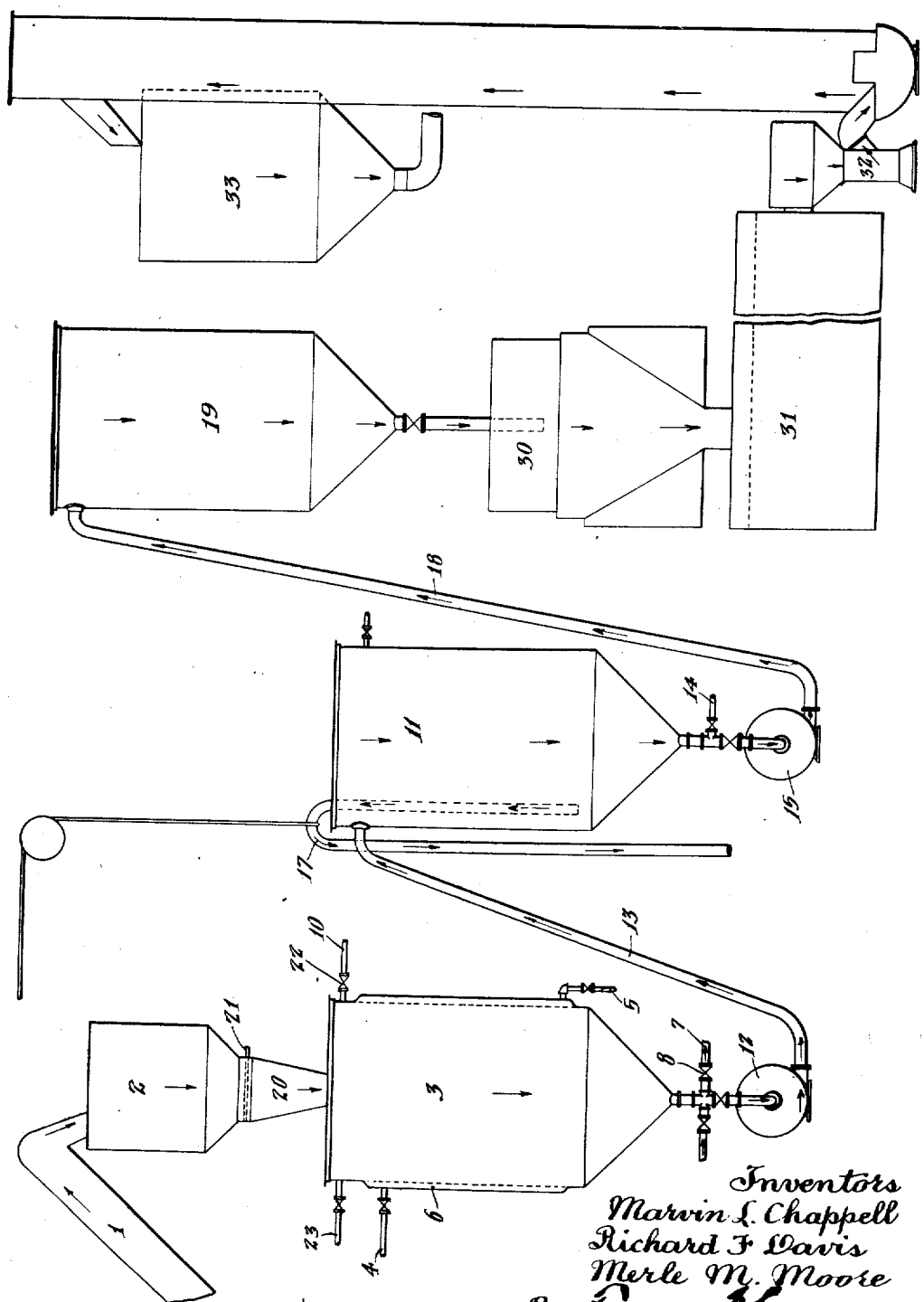

1,642,871

UNITED STATES PATENT OFFICE.

MARVIN L. CHAPPELL, RICHARD F. DAVIS, AND MERLE M. MOORE, OF EL SEGUNDO, CALIFORNIA, ASSIGNORS, BY MESNE ASSIGNMENTS, TO CONTACT FILTRATION COMPANY, OF SAN FRANCISCO, CALIFORNIA, A CORPORATION OF DELAWARE.

CLARIFYING AND DECOLORIZING AGENT AND PROCESS FOR MAKING THE SAME.

Application filed August 1, 1921. Serial No. 488,952.

Our invention relates to the production of a material which may be used for the filtration or decolorization of mineral, vegetable and animal oils and while not limited thereto a material particularly useful for improving the color or petroleum products, such as lubricating oil.

Certain clays found at scattered points in this and other countries are characterized by a micaceous habit, high birefringence and a composition having a ratio of combined alumina to silica ranging from 1:3 to 1:5. These clays are shown by their texture or appearance to have been derived from volcanic tuff or ash and are known as Bentonite consisting usually of the mineral montmorillonite (see Journal of American Ceramic Society, vol. 9 page 2 and Bulletin 626 of the Canada Department of Mines, Mines Branch). For the purpose here these clays will be referred to as clays of the montmorillonite type.

Bentonite or clays of the montmorillonite type possess substantially no natural decolorizing efficiency or so limited a natural decolorizing efficiency as to render impractical the use of the raw clays as an oil decolorizing agent. We have discovered that a highly efficient decolorizing agent can be produced by an acid treatment of clay of the montmorillonite type irrespective of the natural decolorizing efficiency of the raw clay.

By well known methods it has been customary to clarify and improve the color of lubricating oils by percolation of the oil through a long pipe or other form of container filled with fuller's earth or bone char. The temperature of the oil in these processes is customarily maintained below 250° F. as fuller's earth or bone char cannot be economically used above such temperature. These well known methods are very slow and usually require 5 to 7 days before the oil runs through the entire length of the column of clay. These well known methods are not only slow but also require the use of large quantities of the decolorizing agent, for example: A certain lubricating oil will require one ton of thirty to sixty mesh fuller's earth to clarify and improve the color of two thousand gallons to a certain standard grade by the percolation method. It is necessary with these well known methods to use the fuller's earth or char immediately after roasting in order to obtain the highest filtration efficiency.

We are aware that certain processes have been devised for improving the decolorizing efficiency of fuller's earth and like material by an acid treatment and washing with water but such treatments only improve the decolorizing efficiency to a small extent. For example, fuller's earth which will clarify and improve the color of a lubricating oil to a certain standard color at the rate of 2000 gallons per ton of fuller's earth will show after an acid treatment a light increased decolorizing efficiency to only 2500 gallons per ton of acid treated fuller's earth. We find that the decolorizing efficiency of fuller's earth is decreased and not increased by an acid treatment of the character herein described.

We have discovered that by treating clays of the montmorillonite type with the proper quantity of sulphuric acid and removing the soluble reagent products we can obtain a residue that constitutes a decolorizing agent for oils greatly exceeding in efficiency any agent heretofore known. The following are analyses of two clays which have been successfully treated by us in the manner herein described.

|  | Clay from Ash Meadow, Nevada. | Clay from San Diego, Calif. |
|---|---|---|
| $SiO_2$ | 51.20 | 49.56 |
| $TiO_2$ | .10 | .40 |
| $Al_2O_3$ | 17.14 | 15.08 |
| $Fe_2O_3$ | 1.56 | 3.44 |
| $CaO$ | 1.80 | 1.08 |
| $MgO$ | 5.88 | 7.84 |
| $MnO$ | .02 | .01 |
| $H_2O$ | 23.12 | 22.96 |

In the preferred embodiment of our invention our process consists in the manufacture of a clarifying and decolorizing agent by suspending clay of the montmorillonite type with water and treating said clay suspended by water with sulphuric acid in sufficient quantities to render soluble certain constituents contained therein, with or without the application of heat, then washing said acid-treated clay with water to remove said soluble constituents, and if desired finally drying said treated clay and grinding to the required mesh.

The amount of sulphuric acid used in our treatment may be varied with a corresponding variance in the clarifying and decolorizing efficiency of the resultant treated clay. The following figures show the clarifying and decolorizing efficiency of an average sample of San Diego clay after various acid treatments, and also without this treatment:

| Lbs. of 66— Baumé acid used per ton of raw clay. | Gallons of oil treated to standard color (8¼ to 11¾ color, Robinson's colorimeter) per ton of dry treated clay. | Efficiency. |
|---|---|---|
|  |  | Per cent. |
| 0 | 750 | 8¼ |
| 50 | 750 | 8¼ |
| 100 | 2000 | 22½ |
| 200 | 5000 | 55⁵/₉ |
| 400 | 7500 | 83⅓ |
| 600 | 9000 | 100 |
| 800 | 9000 | 100 |
| 1000 | 8000 | 88⁸/₉ |
| 1200 | 7000 | 77⁷/₉ |
| 1400 | 5500 | 61¹/₉ |
| 1600 | 4000 | 44⁴/₉ |
| 1800 | 2000 | 22½ |
| 2000 | 750 | 8¼ |
| 2500 | 0 | 0 |

From the above it appears that between six and eight hundred pounds of acid per ton of said clay gives the greatest efficiency. However, the amount of acid to be employed to give the greatest efficiency will vary with different clays. We have observed that apparently the more alumina ($Al_2O_3$) a clay contains the more acid must be used to gain the greatest efficiency.

With the foregoing preliminary explanation the preferred embodiment of our invention will be more readily understood by reference to the accompanying diagrammatic drawings showing a form of apparatus by which the process may be performed.

In the drawings 1 represents an elevator which conveys the lump clay from the storage, not shown, into a receiver 2, which is balanced on a scale so that the weight of the clay to be treated can be recorded. From the scale bin 2, the clay to be treated in lump form drops through a pipe 20 into a drying tank 3, controlled by a slide-gate 21. When the treating tank 3 has a sufficient charge of clay, water is introduced through a pipe 10 controlled by a valve 22. The mixture of clay and water is then agitated by air introduced through a pipe 7 and controlled by a valve 8. After the clay has been slimed or reaches such a comminuted state that it remains suspended by water, the required quantity of sulphuric acid is introduced through a pipe and valve 23, the mixture being again agitated until a uniform suspension is obtained.

This suspension of acid, water and clay is maintained at a temperature of 180 to 212° F. for ten to fourteen hours by means of the steam jacket 6 which is connected to a steam inlet 4 and outlet 5, the clay and acid water mix being kept in agitation by introduction of air through the pipe and valve 7 during the digestion process. Open steam is used only during the sliming process and is not essential in all cases functioning merely to hasten the sliming operation. As soon as the digestion process is complete, that is, when substantially all of the acid added has reacted with the clay, forming a plurality of sulphate salts, water is introduced through the pipe 10 to replace the water which evaporated during the digestion process.

The mixture is further agitated with air until a uniform mix is obtained and is then transferred into a wash tank 11 by a pump 12 through a pipe 13. The transferred mixture is then allowed to settle in the tank 11 for approximately 24 hours, after which the clear liquid containing the sulphates in solution is siphoned off from the settled treated clay by means of the siphon 17.

The liquid containing the sulphates in solution which was siphoned off, is replaced by hot water (180° Fahr.) and the treated clay again agitated with air by means of a pipe and valve 14. After a uniform mixture is obtained it is again allowed to settle for 24 hours and again the clear liquid is siphoned off in like manner by means of the siphon 17. This operation is repeated until the treated clay is substantially free of sulphates and acid, usually requiring four water washes.

After this treated clay in wash tank 11 is substantially freed of sulphate and acids, it is transferred into a tank 19 by a pump 15 through a pipe 18. From the tank 19 the treated clay is passed over a filter 30, where it is freed from a portion of the remaining water contents. From this rotary filter the filtered treated clay passes into a drier 31 where the balance of the free water is driven off. From the drier 31 the dry treated clay is passed into a grinder 32 and then into a storage bin 33.

Our treated clay does not require roasting in order to attain an economical clarifying and decolorizing efficiency. It need not be used immediately after drying as is the case with fuller's earth which has to be used immediately after roasting in order to obtain greatest filtration efficiency. A certain lubricating oil which requires one ton of thirty to sixty mesh fuller's earth to clarify and improve the color of two thousand gallons to a certain standard grade by the percolation method, will require only one-fifth of a ton of our treated clay to obtain the same grade and color.

An analysis of the treated clay (from Ash Meadow) is as follows:

| | Per cent. |
|---|---|
| Loss on ignition | 6.3 |
| $SiO_2$ | 66.3 |
| $Fe_2O_3$ | 1.9 |
| $Al_2O_3$ | 21.04 |
| CaO | .5 |
| MgO | 3.6 |

Analysis of extracted sulphates

| | Per cent. |
|---|---|
| $Fe_2(SO_4)_3$ | 4.13 |
| $Al_2(SO_4)_3.18H_2O$ | 71.12 |
| $CaSO_4.2H_2O$ | .63 |
| $MgSO_4.7H_2O$ | 24.12 |

The decolorizing agent derived from our process is adapted to function efficiently above 250° F., whereas this temperature cannot be economically exceeded with fuller's earth. We have obtained good results by subjecting the commingled oil and agent produced by our process to a temperature between 250°–310° F. for approximately five minutes. This is a great saving over the consumption of 5 to 7 days required with fuller's earth by the percolation method. Two practical methods of utilizing our treated clay are described in United States Letters Patent Nos. 1,404,374 and 1,404,375 granted January 24, 1922.

Our invention is not limited to the details of the above described preferred embodiment which is intended by way of example only, but is of the scope defined in the following claims.

It will be apparent that the clay may be slimed in the first instance in a dilute acid solution instead of sliming the clay in water and thereafter adding the acid, without departing from our invention.

We claim:

1. A process of preparing a clarifying or decolorizing agent which includes agitating a clay of the montmorillonite type, with water until the clay is in a plastic or slimy condition and treating the clay with an acid and thereby extracting a part of the clay and converting the non-extracted clay into the necessary state or structure to produce an active clarifying or decolorizing agent.

2. A process of preparing a clarifying or decolorizing agent which consists in mixing a clay of the montmorillonite type with water until the clay is in a plastic or slimy condition, treating the clay with an acid to extract a part of the clay, and separating and treating the remainder of the clay.

3. A process of preparing a clarifying and decolorizing agent which consists in mixing a clay of the montmorillonite type in water until the clay has been slimed, treating the clay with sulphuric acid and washing the treated clay.

4. A process of preparing a clarifying and decolorizing agent which consists in agitating a clay of the montmorillonite type with water until the clay has been slimed, adding sulphuric acid to the mixture of suspended clay and water, maintaining the suspended clay, water and acid at a temperature of approximately 180° to 212° F. for from approximately ten to fourteen hours, washing the treated clay by introducing water and permitting the clay to settle therefrom, and drying and grinding the treated clay.

5. The method of producing a decolorizing material for oils which consists in reducing the mineral montmorillonite to a plastic condition, treating the plastic material with acid, washing the acid from the mineral, and pulverizing the mineral so washed.

6. The method of producing a decolorizing material for oil which consists in pulverizing the mineral montmorillonite, mixing the powdered mineral with water to form a stiff paste, treating the paste by adding acid thereto, heating the paste containing the acid, washing the heated material to free the material of soluble matter and acid, drying the washed material and pulverizing the dried material.

7. The method of producing decolorizing material for oils which consists in reducing the mineral montmorillonite to a plastic condition by mixing with water, treating the plastic material with sulfuric acid in the proportion of one-half pound of acid to each pound of dry material, washing the free acid from the treated material, and pulverizing the insoluble material.

8. The method of producing a decolorizing material for the treatment of oils which consists in treating the mineral montmorillonite with acids and removing the water soluble constituents of the resulting mixture.

9. A method of producing a decolorizing material for the treatment of oils which consists in treating a clay of the montmorillonite type with a quantity of sulphuric acid not less than one tenth the weight of the dry clay and washing the residue to remove the soluble reaction products.

10. A method of producing a decolorizing material for the treatment of oils which consists in treating a clay of the montmorillonite type with a quantity of sulphuric acid not less than one tenth the weight of the dry clay, digesting the mixture at a temperature of not less than 180° F., and washing the residue to remove the soluble reaction products.

11. A method of producing a decolorizing material for the treatment of oils which consists in treating a clay of the montmorillonite type with sulphuric acid, producing a substantially complete reaction between the acid and the clay, and washing the insoluble residue with water to eliminate soluble reaction products.

12. A method of producing a decolorizing material for the treatment of oils which consists in treating a clay of the montmorillonite type with sulphuric acid, producing a substantially complete reaction between the acid and the clay, washing the insoluble residue with water to eliminate soluble reaction products, and drying the insoluble residue.

13. A decolorizing agent for the treatment of oils consisting of the insoluble residue produced by the reaction of sulphuric acid on a clay of the montmorillonite type.

14. A decolorizing agent for treatment of oils consisting of the insoluble residue produced by the substantially complete reaction of a quantity of sulphuric acid on a clay of the montmorillonite type not less than one tenth the weight of the clay and from which residue substantially all of the soluble reaction products have been removed.

15. A decolorizing agent for the treatment of oils consisting of the pulverulent residue produced from the substantially complete reaction of sulphuric acid on a clay of the montmorillonite type and from which the soluble reaction products have been removed.

Signed at El Segundo, California, this 25th day of July, 1921.

MARVIN L. CHAPPELL.
RICHARD F. DAVIS.
MERLE M. MOORE.

the acid and the clay, and washing the insoluble residue with water to eliminate soluble reaction products.

12. A method of producing a decolorizing material for the treatment of oils which consists in treating a clay of the montmorillonite type with sulphuric acid, producing a substantially complete reaction between the acid and the clay, washing the insoluble residue with water to eliminate soluble reaction products, and drying the insoluble residue.

13. A decolorizing agent for the treatment of oils consisting of the insoluble residue produced by the reaction of sulphuric acid on a clay of the montmorillonite type.

14. A decolorizing agent for treatment of oils consisting of the insoluble residue produced by the substantially complete reaction of a quantity of sulphuric acid on a clay of the montmorillonite type not less than one tenth the weight of the clay and from which residue substantially all of the soluble reaction products have been removed.

15. A decolorizing agent for the treatment of oils consisting of the pulverulent residue produced from the substantially complete reaction of sulphuric acid on a clay of the montmorillonite type and from which the soluble reaction products have been removed.

Signed at El Segundo, California, this 25th day of July, 1921.

MARVIN L. CHAPPELL.
RICHARD F. DAVIS.
MERLE M. MOORE.

CERTIFICATE OF CORRECTION.

Patent No. 1,642,871.  Granted September 20, 1927, to

MARVIN L. CHAPPELL ET AL.

It is hereby certified that error appears in the printed specification of the above numbered patent requiring correction as follows: Page 1, line 10, before the word "micaceous" insert the word "microscopic"; same page, line 68, strike out the words "an acid treatment a light" and insert instead "a light acid treatment an"; page 3, line 48, claim 1, after the word "type" strike out the comma; and that the said Letters Patent should be read with these corrections therein that the same may conform to the record of the case in the Patent Office.

Signed and sealed this 17th day of January, A. D. 1928.

Seal.

M. J. Moore,
Acting Commissioner of Patents.

CERTIFICATE OF CORRECTION.

Patent No. 1,642,871.                               Granted September 20, 1927, to

MARVIN L. CHAPPELL ET AL.

It is hereby certified that error appears in the printed specification of the above numbered patent requiring correction as follows: Page 1, line 10, before the word "micaceous" insert the word "microscopic"; same page, line 68, strike out the words "an acid treatment a light" and insert instead "a light acid treatment an"; page 3, line 48, claim 1, after the word "type" strike out the comma; and that the said Letters Patent should be read with these corrections therein that the same may conform to the record of the case in the Patent Office.

Signed and sealed this 17th day of January, A. D. 1928.

Seal.

M. J. Moore,
Acting Commissioner of Patents.